US012630110B2

(12) United States Patent
Chang

(10) Patent No.: US 12,630,110 B2
(45) Date of Patent: May 19, 2026

(54) DEPLOYMENT SYSTEM FOR PEDESTRIAN PROTECTION IN A VEHICLE USING PEDESTRIAN COLLISION PREDICTION INFORMATION AND A METHOD THEREOF

(71) Applicants: HYUNDAI MOTOR COMPANY, Seoul (KR); KIA CORPORATION, Seoul (KR)

(72) Inventor: Won-Tak Chang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 211 days.

(21) Appl. No.: 18/520,822

(22) Filed: Nov. 28, 2023

(65) Prior Publication Data

US 2024/0351550 A1      Oct. 24, 2024

(30) Foreign Application Priority Data

Apr. 21, 2023      (KR) ........................ 10-2023-0052715

(51) Int. Cl.
| | |
|---|---|
| *B60R 21/34* | (2011.01) |
| *B60R 21/0134* | (2006.01) |
| *B60R 21/0136* | (2006.01) |
| *B60R 21/00* | (2006.01) |

(52) U.S. Cl.
CPC .......... *B60R 21/34* (2013.01); *B60R 21/0134* (2013.01); *B60R 21/0136* (2013.01); *B60R 2021/003* (2013.01); *B60R 2021/343* (2013.01); *B60R 2021/346* (2013.01)

(58) Field of Classification Search
CPC . B60R 21/34; B60R 21/0134; B60R 21/0136; B60R 2021/01286; B60R 2021/346
See application file for complete search history.

(56) References Cited

U.S. PATENT DOCUMENTS

| | | | | |
|---|---|---|---|---|
| 5,249,157 | A * | 9/1993 | Taylor ................... | G01S 7/4811 |
| | | | | 342/107 |
| 12,384,412 | B2 * | 8/2025 | Zimmermann ...... | A61B 5/6893 |
| 2019/0031199 | A1 * | 1/2019 | Dudar ................... | B60W 40/02 |
| 2023/0219495 | A1 * | 7/2023 | Takamatsu ............... | B60Q 3/80 |
| | | | | 315/77 |
| 2024/0351550 | A1 * | 10/2024 | Chang ..................... | B60R 21/34 |
| 2025/0115270 | A1 * | 4/2025 | Orbay ................... | G06N 20/00 |

FOREIGN PATENT DOCUMENTS

KR        20160070979 A        6/2016

* cited by examiner

*Primary Examiner* — John Kwon
(74) *Attorney, Agent, or Firm* — Lempia Summerfield Katz LLC

(57) ABSTRACT

A deployment system for pedestrian protection in a vehicle using pedestrian collision prediction information includes: a pedestrian collision prediction part configured to analyze pedestrian collision recognition information and predict a pedestrian collision; and a temperature response variable controller configured to set a deployment determination threshold of the deployment system according to an air temperature when the pedestrian collision is predicted by the pedestrian collision prediction part.

17 Claims, 9 Drawing Sheets

TREND OF PDI2 DEPLOYMENT SIGNAL
PER TEMPERATURE AND LOWER PORTION IMPACT SIGNAL

Figure 5:
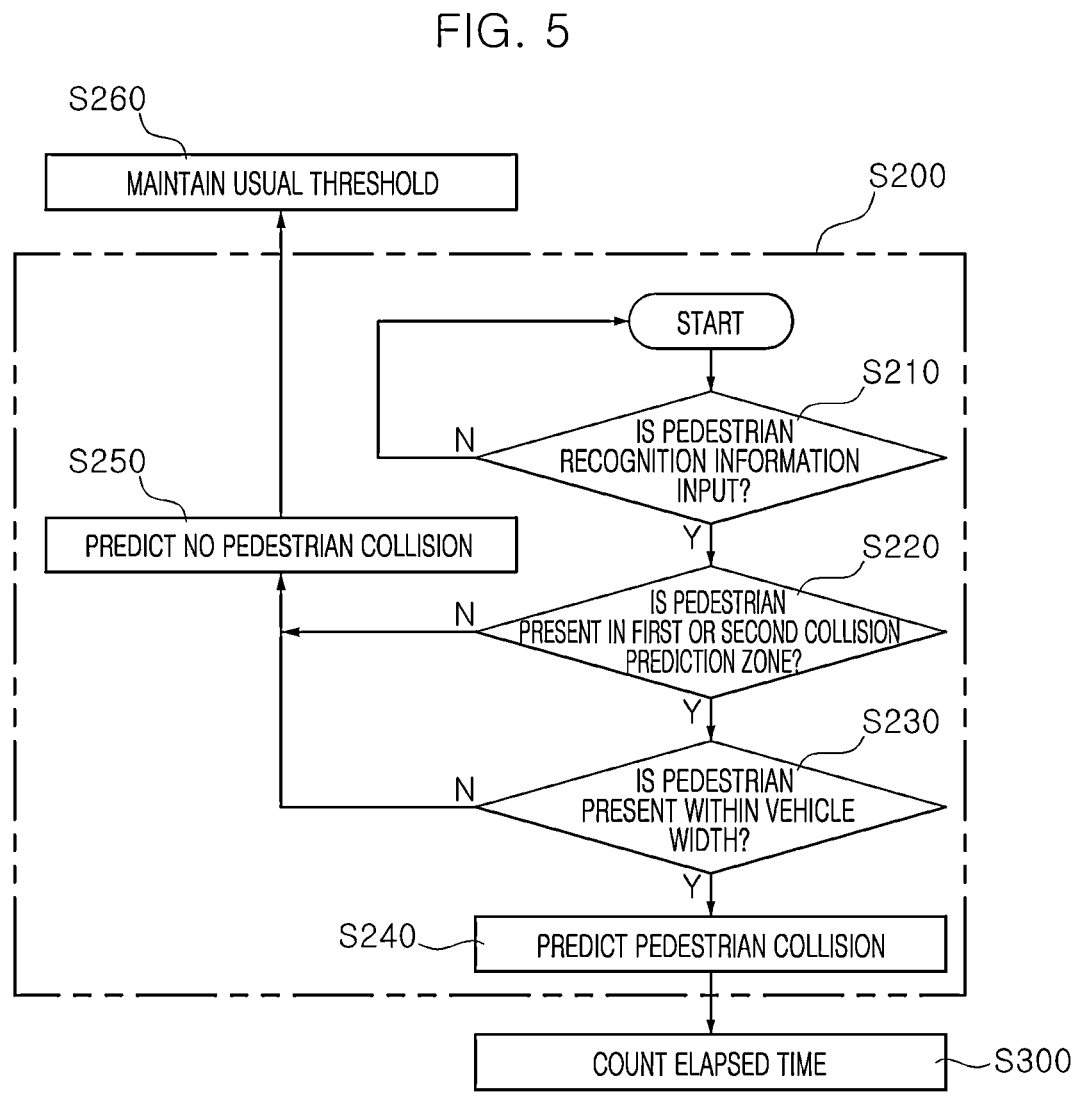

MAINTAIN USUAL THRESHOLD

S200

START

S210

N ← IS PEDESTRIAN RECOGNITION INFORMATION INPUT?

Y

S250

PREDICT NO PEDESTRIAN COLLISION

S220

N ← IS PEDESTRIAN PRESENT IN FIRST OR SECOND COLLISION PREDICTION ZONE?

Y

S230

N ← IS PEDESTRIAN PRESENT WITHIN VEHICLE WIDTH?

Y

S240 — PREDICT PEDESTRIAN COLLISION

COUNT ELAPSED TIME — S300

DEPLOYMENT SYSTEM FOR PEDESTRIAN PROTECTION IN A VEHICLE USING PEDESTRIAN COLLISION PREDICTION INFORMATION AND A METHOD THEREOF

CROSS-REFERENCE(S) TO RELATED APPLICATIONS

This application claims priority to and the benefit of Korean Patent Application No. 10-2023-0052715, filed on Apr. 21, 2023, which is incorporated herein by reference in its entirety.

BACKGROUND

Field of Present Disclosure

Embodiments of the present disclosure relate to a deployment system for pedestrian protection using an air temperature around a vehicle and pedestrian collision prediction information, and a method thereof.

Description of Related Art

In the event of a pedestrian collision, the existing passive pedestrian protection system determines a collision position using a pressure and acceleration. The existing passive pedestrian protection system also determines a threshold for determining a collision object according to the collision position and temperature condition. When the collision position is determined, the existing passive pedestrian protection system measures an outside air temperature in order to correct a threshold, which is used in determining the collision object according to the collision position, to a level in which bumper and pressure characteristics according to the outside air temperature are considered. Pressure sensors are installed at both ends of a tube installed in a bumper to generate a pressure change in the tube in the event of a collision. The collision position is then determined using a time point at which a pressure change signal reaches each pressure sensor from a point where the pressure change occurs in the tube. However, it is not possible to recognize a weak impact signal caused by the weakening of a compressed amount of the hardened bumper in a low-temperature state with respect to a pedestrian impact. In addition, there is a problem in that the impact to a lower portion of a vehicle cannot be distinguished from a signal introduced directly or through the bumper.

In other words, a deployment system for pedestrian protection in the vehicle has a problem of mis-deployment in a low temperature limit condition. As a result, the deployment system poses a problem in that it cannot properly protect pedestrians.

The statements in this BACKGROUND section merely provide background information related to the present disclosure and may not constitute prior art.

SUMMARY

Embodiments of the present disclosure provide a deployment system for pedestrian protection using an air temperature around a vehicle and pedestrian collision prediction information by setting a deployment determination threshold of the deployment system for pedestrian protection according to the air temperature. The present disclosure also provides a method of controlling the deployment system for pedestrian protection in a vehicle using pedestrian collision prediction information.

Other objects and advantages of the present disclosure can be understood by the following description and become apparent with reference to the embodiments of the present disclosure. Also, it should be obvious to those having ordinary skill in the art to which the present disclosure pertains that the objects and advantages of the present disclosure can be realized by the means as claimed and combinations thereof.

In accordance with an embodiment of the present disclosure, there is provided a deployment system for pedestrian protection in a vehicle using pedestrian collision prediction information. The deployment system includes: a pedestrian collision prediction part configured to analyze pedestrian collision recognition information and predict a pedestrian collision, and a temperature response variable controller configured to set a deployment determination threshold of the deployment system according to an air temperature when the pedestrian collision is predicted by the pedestrian collision prediction part. The temperature response variable controller may set the deployment determination threshold to be smaller as the air temperature is lowered.

When the air temperature is less than or equal to a critical temperature (T_singularity), the deployment determination threshold may be adjusted downward as much as $\Delta\alpha$ to be placed below a shock absorber deformation signal of the critical temperature (T_singularity) and a shock absorber deformation signal, by which the deployment system is not deployed at room temperature, due to an impact applied to a lower portion of the vehicle.

When the air temperature is greater than the critical temperature (T_singularity), the deployment determination threshold may be adjusted downward as much as $\Delta\beta$ to be placed above the shock absorber deformation signal, by which the deployment system is not deployed at room temperature, due to the impact applied to the lower portion of the vehicle.

The deployment determination threshold may be placed above, as much as a safety margin, the shock absorber deformation signal, by which the deployment system is not deployed at room temperature, due to the impact applied to the lower portion of the vehicle. Additionally, $\Delta\beta$ of the downwardly-adjusted deployment determination threshold may be greater than $\Delta\beta$.

The pedestrian collision prediction part may recognize a collision of a pedestrian with a vehicle through a camera, a radar, or an ultrasonic sensor as the pedestrian collision recognition information. The pedestrian collision prediction part may predict the collision of the pedestrian by determining whether the pedestrian is present in a collision prediction zone based on a longitudinal relative speed, a longitudinal relative distance, a time to collision (TTC), and a transverse relative distance with respect to the pedestrian. When an elapsed time is within a specific time after the collision of the pedestrian is predicted, the downwardly-adjusted deployment determination threshold of the deployment system may be maintained.

When an elapsed time is greater than a specific time after the collision of the pedestrian is predicted, the deployment determination threshold of the deployment system may be restored to its original threshold. One example of the shock absorber deformation signal may be a bumper deformation signal.

In accordance with another embodiment of the present disclosure, there is provided a method of controlling a deployment system for pedestrian protection in a vehicle using pedestrian collision prediction information. The method includes predicting, by a pedestrian collision prediction part, a collision of a pedestrian at a vehicle speed within a predetermined range; counting an elapsed time; and determining whether an air temperature is greater than a critical temperature (T_singularity). Additionally, when the air temperature is greater than the critical temperature (T_singularity), the method includes adjusting downward the deployment determination threshold as much as Δβ to be placed above a bumper deformation signal, by which the deployment system is not deployed at room temperature, due to an impact applied to a lower portion of the vehicle.

When the air temperature is less than or equal to a critical temperature (T_singularity), the deployment determination threshold may be adjusted downward as much as Δα to be placed below a shock absorber deformation signal of the critical temperature (T_singularity) and a shock absorber deformation signal, by which the deployment system is not deployed at room temperature, due to the impact applied to the lower portion of the vehicle. When the elapsed time is greater than a specific time, the deployment determination threshold that is adjusted downward as much as Δα or Δβ may be restored to its original usual threshold. When the elapsed time is less than or equal to a specific time, the deployment determination threshold that is adjusted downward as much as Δα or Δβ may be maintained.

The predicting of the collision of the pedestrian may include determining whether recognition information of the pedestrian is input, and determining whether the pedestrian is present in a collision prediction zone. The predicting of the collision of the pedestrian may also include determining whether the pedestrian is present within a vehicle width. The recognition information of the pedestrian may include one or more among a longitudinal relative speed, a longitudinal relative distance, a time to collision (TTC), and a transverse relative distance with respect to the pedestrian.

BRIEF DESCRIPTION OF THE DRAWINGS

Since these drawings are for reference in explaining embodiments of the present disclosure, the technical idea of the present disclosure should not be construed as limited to the accompanying drawings.

FIG. 5 is a detailed flowchart illustrating an operation of predicting a pedestrian collision in the flowchart of FIG. 4.

DETAILED DESCRIPTION

Figure 1:
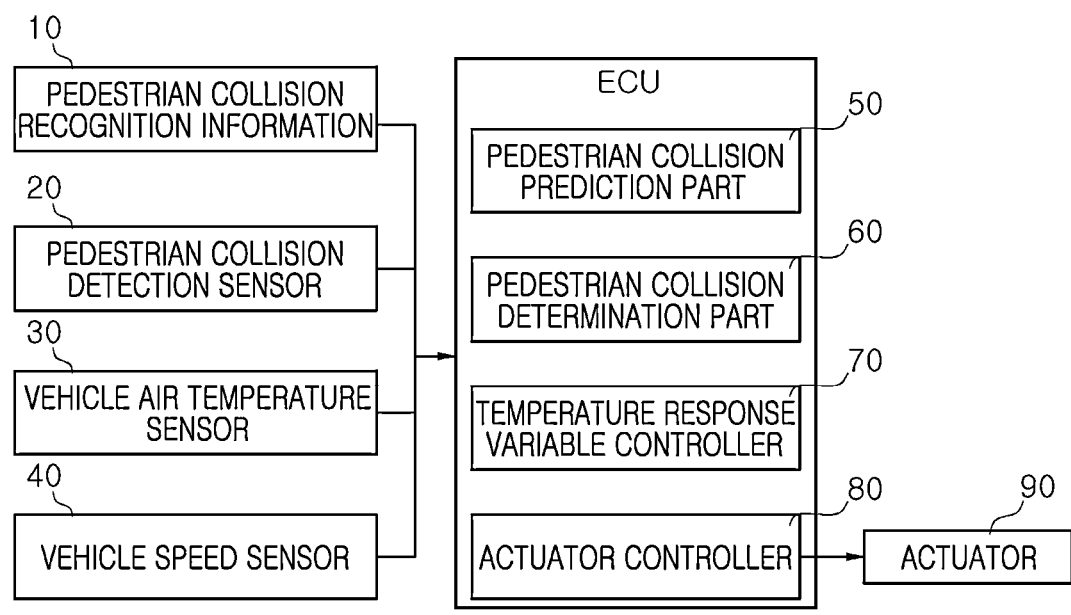
FIG. 1 is a block diagram illustrating the entire system of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function has been omitted when it is determined that it interferes with the understanding of the embodiments of the present disclosure.

In describing the components of the embodiment according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or perform that operation or function.

FIG. 1 shows the entire system of the present disclosure. The system acquires information from one or more among a pedestrian collision recognition information 10, a pedestrian collision detection sensor 20, a vehicle air temperature sensor 30, and a vehicle speed sensor 40, and the acquired information is transmitted to an electronic control unit (ECU). The pedestrian collision recognition information 10 recognizes a collision of a pedestrian with a vehicle through cameras, radars, and an ultrasonic sensor. The pedestrian collision detection sensor 20 is also a sensing part capable of directly detecting an impact of the pedestrian applied from the vehicle, such as an optical sensor, a pressure tube sensor, and an acceleration sensor.

The ECU includes a pedestrian collision prediction part 50, a pedestrian collision determination part 60, a temperature response variable controller 70, and a deployment system controller 80 for pedestrian protection. The pedestrian collision prediction part 50 predicts a pedestrian collision by analyzing the pedestrian collision recognition information 10. The pedestrian collision determination part 60 determines a pedestrian collision through the pedestrian collision detection sensor 20 which directly detects an impact. The temperature response variable controller 70 uses a result value of the pedestrian collision prediction part 50 together with a temperature as an input when determining a deployment of a pedestrian protection type deployment system based on a specific temperature. The deployment system controller 80 for pedestrian protection, such as a windshield airbag or an active hood, operates each actuator 90 for operating the windshield airbag or the active hood.

The term "unit," "part," "controller" or "module" used in this specification signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

FIG. 2 shows diagrams illustrating pedestrian collision prediction zones using a longitudinal relative speed, a longitudinal relative distance, a time to collision (TTC), and a transverse relative distance with respect to a pedestrian, which are received from active sensors. The relative speed means a relative speed between the vehicle and the pedestrian. When the vehicle is completely braked, a vehicle pulling of about 1 g acceleration is formed, and a speed at this point is defined as an operating speed of the pedestrian protection type deployment system. The active sensor means a camera, a radar, or an ultrasonic sensor, which recognizes a collision between a pedestrian and a vehicle from the pedestrian collision recognition information 10.

Figure 2A:
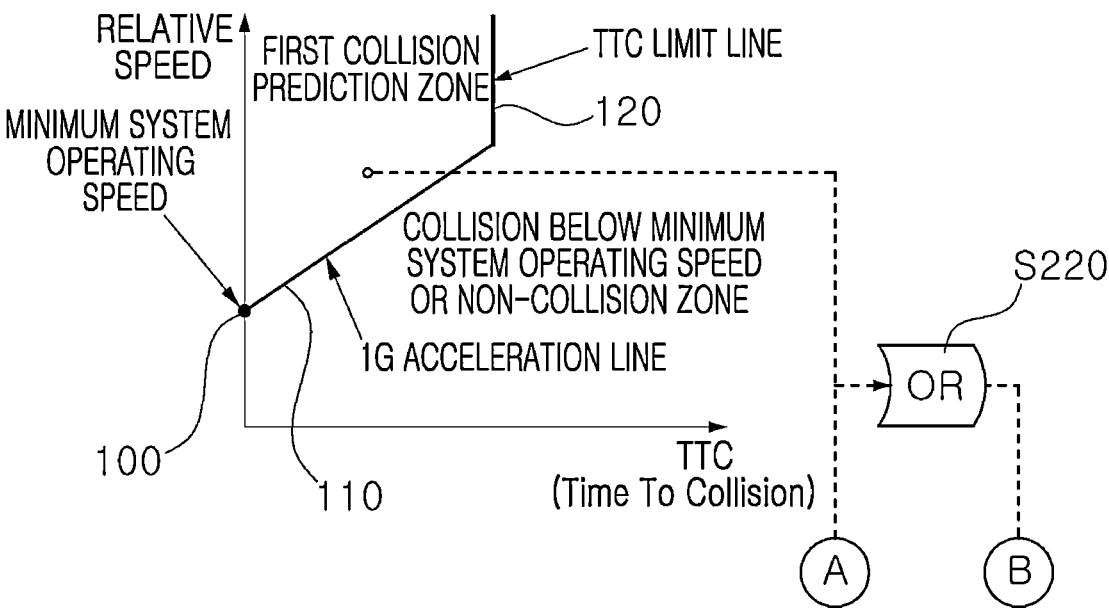
FIGS. 2A, 2B, and 2C are diagrams illustrating pedestrian collision prediction zones which are set according to a longitudinal relative speed, a longitudinal relative distance, a time to collision (TTC), and a transverse relative distance with respect to a pedestrian, which are received from active sensors.

FIG. 2A shows a linear slope of 1 g acceleration line 110 and a TTC limit line 120 having a constant TTC in a relationship between a TTC (x-axis) and a longitudinal relative speed (y-axis). A lower side of the 1 g acceleration line and a right side of the TTC limit line are a zone in which a collision occurs below a minimum speed for operation of the deployment system or are a non-collision zone, and an opposite zone is a first collision prediction zone. A point where the 1 g acceleration line meets the relative speed of the Y axis is a minimum operating speed 100 of the pedestrian protection type deployment system.

If the relative speed is greater than the 1 g acceleration line, it is included in the first collision prediction zone, and if the relative speed is less than the 1 g acceleration line, the vehicle will collide at or below the minimum speed or is in a non-collision zone. Likewise, bounded by the TTC limit, if the TTC is less than the TTC limit, it is included in the first collision prediction zone, and if the TTC is greater than the TTC limit, it is in the non-collision zone.

Figure 2B:
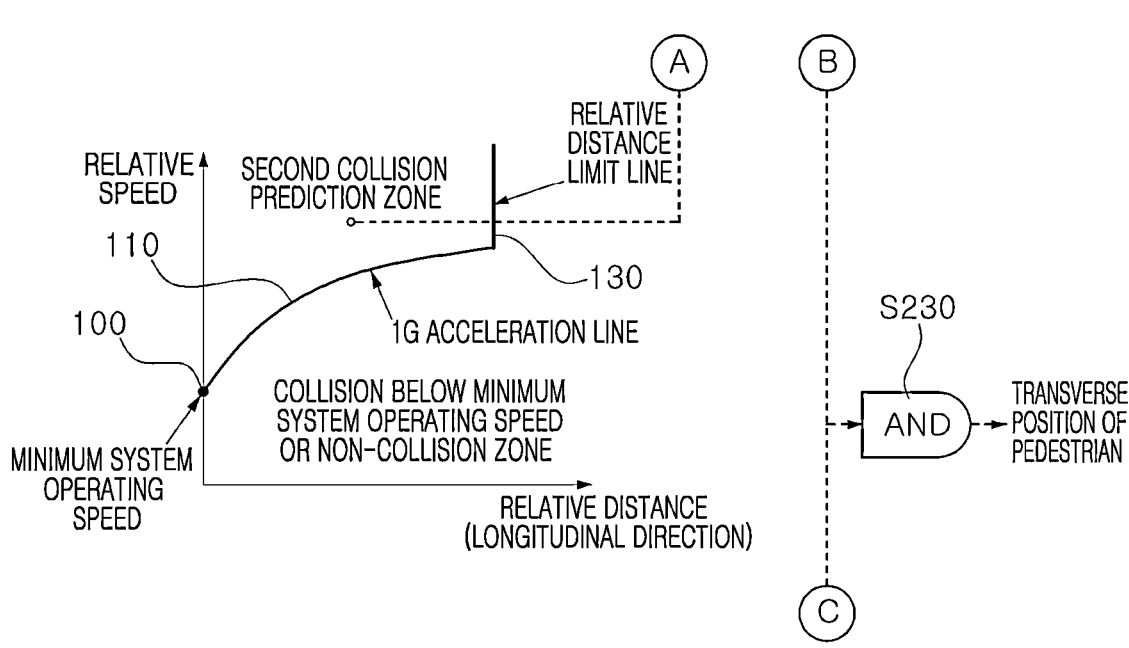

FIG. 2B shows a 1 g acceleration curve 110 and a relative distance limit line 130 where a longitudinal relative distance remains constant in a relationship between a longitudinal relative distance (x-axis) and the longitudinal relative speed (y-axis).

A lower side of the 1 g acceleration curve and a right side of the relative distance limit line are a zone in which a collision occurs below a minimum speed for operation of the deployment system or are a non-collision zone. Additionally, an opposite zone is a second collision prediction zone.

A point where the 1 g acceleration curve meets the relative speed of the Y axis is a minimum operating speed of 100 of the pedestrian protection type deployment system. If the relative speed is greater than the 1 g acceleration curve, it is included in the second collision prediction zone, and if the relative speed is less than the 1 g acceleration curve, the vehicle will collide at or below the minimum speed or is in the non-collision zone. Similarly, if the relative distance is less than the relative distance limit line, the vehicle is included in the second collision prediction zone, and if the relative distance is greater than the relative distance limit line, it is in the non-collision zone.

Figure 2C:
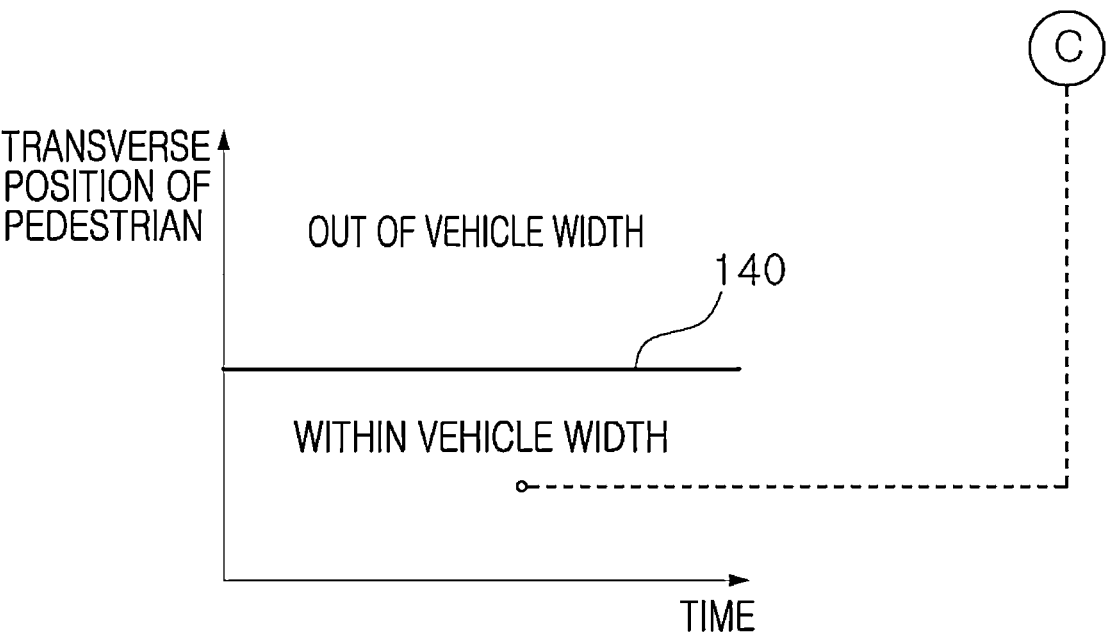

FIG. 2C shows a vehicle width boundary line 140 where a transverse position of the pedestrian (y-axis) remains constant over a time (x-axis). When the transverse position of the pedestrian is greater than the vehicle width boundary line 140, the pedestrian is out of a vehicle width, and when the transverse position of the pedestrian is less than the vehicle width boundary line 140, the pedestrian is within the vehicle width.

As illustrated in FIG. 2A or 2B, it is determined whether the pedestrian is present in the collision prediction zone based on the longitudinal relative speeds and the longitudinal relative distances of the vehicle and the pedestrian, and the TTC. This is related to an operation S220 which is further described below. In addition, if the results of the operation S220 and S230 are confirmed, in addition to the longitudinal relative speeds, the longitudinal relative distances, and the TTC of the vehicle and the pedestrian, collision prediction of the pedestrian is determined at the transverse position of the pedestrian, which is shown below the boundary line 150 in FIG. 2C. This is related to step S230 below.

FIG. 3 shows a change in a bumper deformation signal according to adjusting a temperature downward at specific intervals and variable control in response to the temperature in the temperature response variable controller. The bumper deformation signal is a signal used for active hood control which is one example of the deployment system for pedestrian protection of the present disclosure. A bumper is one example of a shock absorber as an exterior part of a vehicle that directly collides with a pedestrian. Thus, the bumper deformation signal, which is described below, is one example of a deformation signal of a buffering part.

Figure 3A:
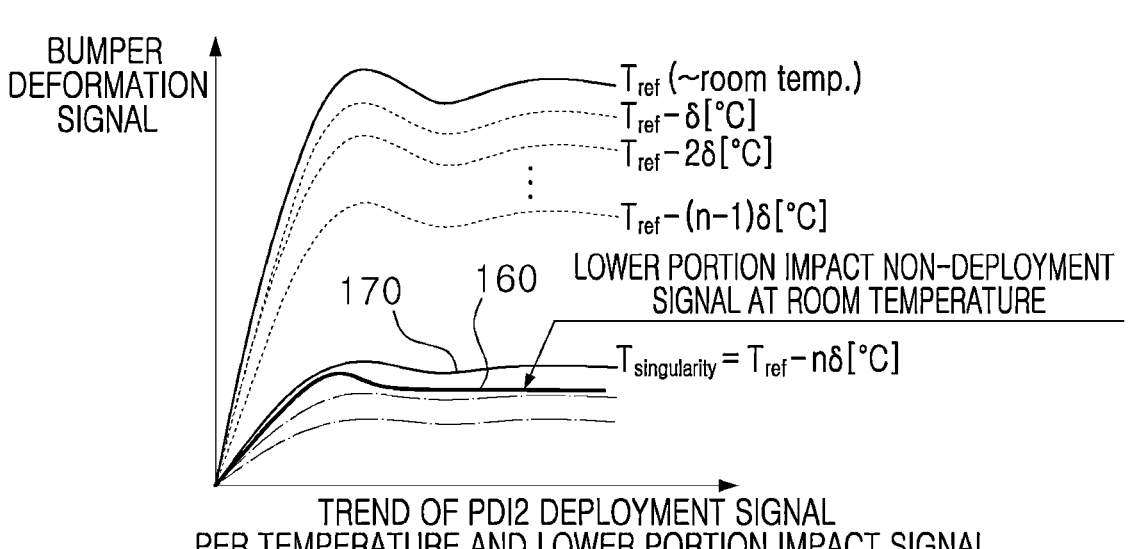
FIGS. 3A, 3B, and 3C are diagrams illustrating a change in a bumper deformation signal according to a change in temperature and variable control in response to the temperature.

FIG. 3A shows a bumper deformation signal used as a deployment signal of the pedestrian protection type deployment system for each temperature measured by a pedestrian detection impactor. FIG. 3 also shows a lower impact signal in which the pedestrian protection deployment system is not deployed at room temperature.

As the air temperature decreases, a magnitude of the bumper deformation signal is decreased, and as the outside temperature decreases, the magnitude of the bumper deformation signal is decreased. Additionally, a temperature singularity at which a deformation amount of the bumper is significantly decreased according to the temperature is referred as a critical temperature T_singularity. The existing pedestrian protection type deployment system in which a difference in bumper deformation according to the temperature and the critical temperature are not considered, does not distinguish the bumper deformation signal from a bumper deformation signal 160 due to an impact applied to a lower portion of the vehicle at room temperature. Thus, the pedestrian protection type deployment system is not deployed at the critical temperature T_singularity or there is a risk of mis-deployment.

FIG. 3A shows that the bumper deformation signal 160 due to the impact applied to the lower portion of the vehicle at room temperature is set to be smaller than a pedestrian signal 170 at the critical temperature T_singularity. FIG. 3C shows that, on this premise, the threshold position for determining the deployment of the pedestrian protection type deployment system is set in FIGS. 3B and 3C.

Figure 3B:
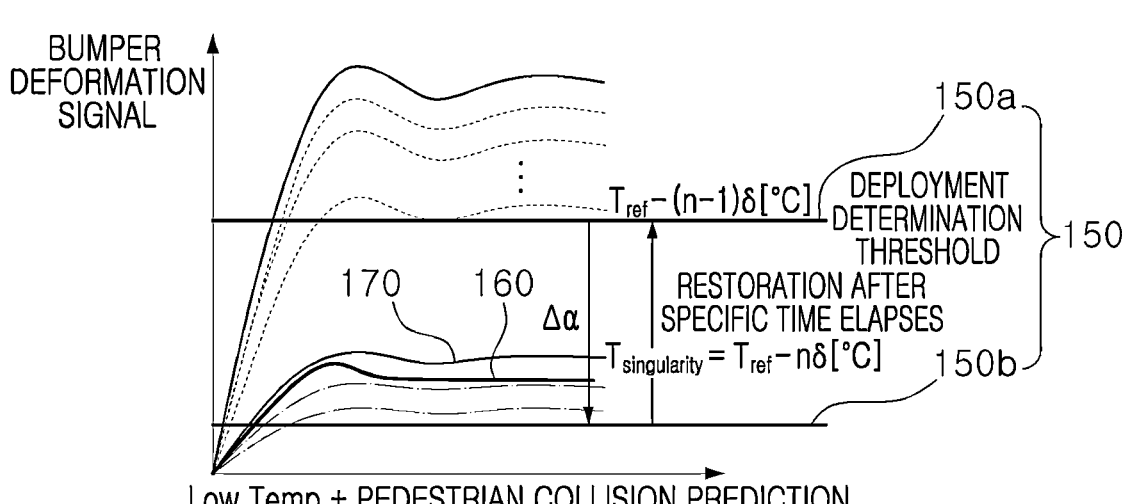
Figure 3C:
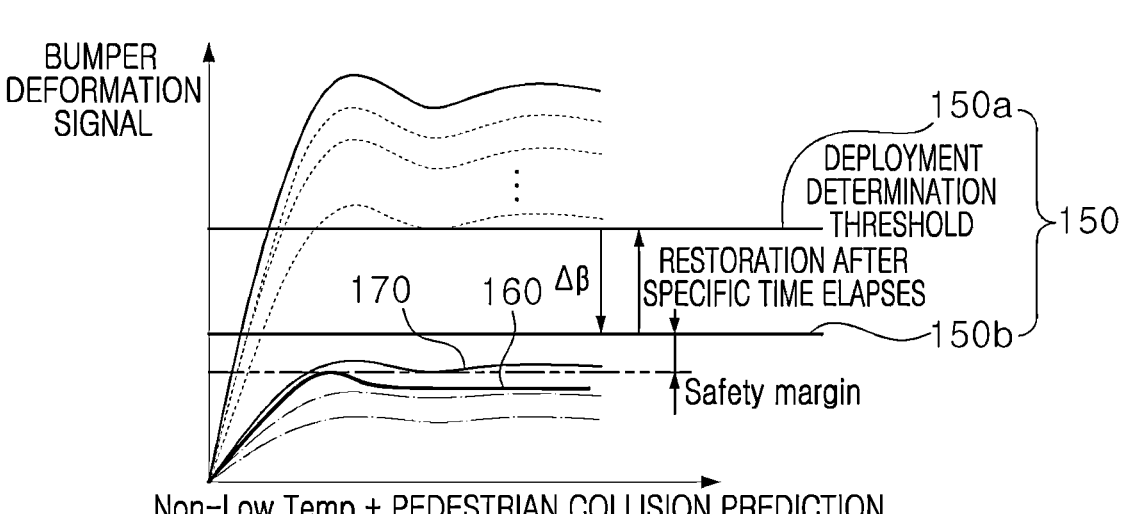

FIG. 3B is applied when an air temperature of the vehicle is less than or equal to the critical temperature T_singularity. When a pedestrian collision is predicted, a threshold 150 for determining the deployment of the pedestrian protection type deployment system may be temporarily adjusted downward as much as Δα to protect the pedestrian. Depending on an air temperature sensor condition, the threshold 150 is temporarily adjusted downward and then restored.

The threshold 150 may be expressed separately as a pre-downward threshold 150*a* and a post-downward threshold 150*b*. The downwardly-adjusted threshold may be set to be smaller than a bumper deformation signal 170 at the critical temperature T_singularity and to be smaller than the bumper deformation signal 160 due to the impact applied to the lower portion of the vehicle at room temperature.

FIG. 3C is applied when the air temperature sensor of the vehicle is greater than the critical temperature T_singularity. In the case of a time until the pedestrian collision occurs and in the case in which an actual collision is imminent, the threshold for determining the deployment of the pedestrian protection type deployment system is temporarily adjusted downward as much as $\Delta\beta$ and then restored. A position of the downwardly-adjusted threshold is set to be greater than, by as much as a predetermined safety margin, or equal to the bumper deformation signal 160 due to the impact applied to the lower portion of the vehicle at room temperature.

A restoration time after the temporal downward adjustment may be set to a time corresponding to the sum of a time until the collision occurs and a time corresponding to the safety margin, which can be more robust to the mis-deployment. For example, when a time of the sum of an estimated time until the collision occurs and a time at which a collision occurs from the time point of determining the collision prediction is one second, the threshold is adjusted downward for 1.5 seconds by adding a safety margin of 0.5 seconds and then restored.

Figure 4:
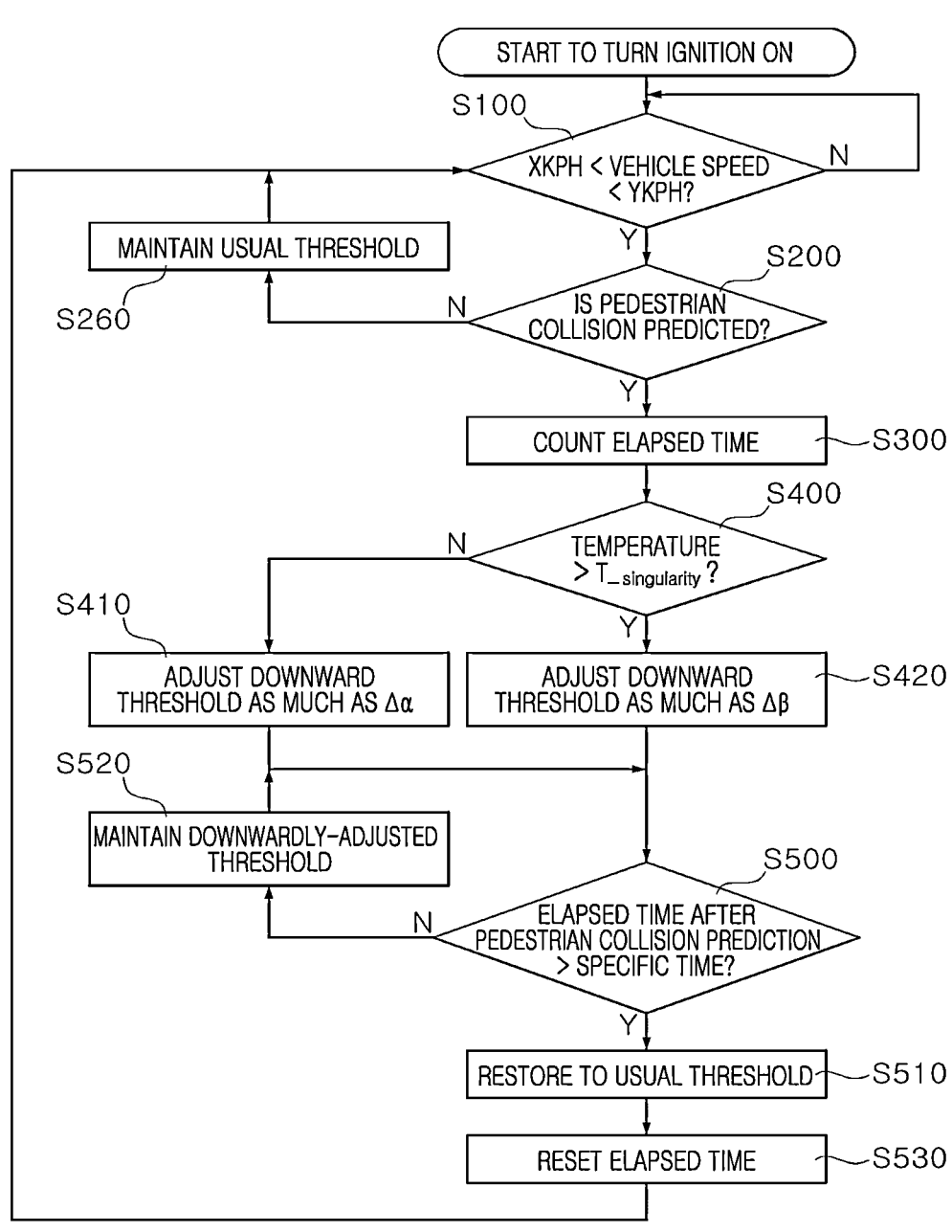
FIG. 4 is a flowchart illustrating a deployment process of a pedestrian protection type deployment system according to the present disclosure.

FIG. 4 is a flowchart illustrating a deployment process of a pedestrian protection type deployment system according to the present disclosure. After an ignition is turned on, an operation of determining whether a vehicle speed is within a predetermined range (S100) is performed. When the vehicle speed is within the predetermined range, an operation of predicting a pedestrian collision (S200) is performed. The vehicle speed means a vehicle speed in the longitudinal direction of a forwarding vehicle, and when the vehicle speed is out of a predetermined vehicle speed range, the procedure does not proceed to the predicting of the pedestrian collision (S200). Details of S200 are described again with reference to FIG. 5.

When the pedestrian collision is predicted in S200, a time required until the collision between the vehicle and pedestrian is counted (S300).

In act S400, the system determines whether to adjust downward the threshold for determining the deployment of the pedestrian protection type deployment system according to how much the air temperature is lower than a reference temperature.

In other words, when a temperature measured by the air temperature sensor is less than or equal to the critical temperature T_singularity, the threshold for determining the deployment of the pedestrian protection type deployment system is adjusted downward as much as $\Delta\alpha$ (S410). Additionally, when the temperature measured by the air temperature sensor is greater than the critical temperature T_singularity, the threshold for determining the deployment of the pedestrian protection type deployment system is adjusted downward as much as $\Delta\beta$ (S420). In this case, $\Delta\alpha$ is greater than $\Delta\beta$, and this means that, when the air temperature is less than the critical temperature T_singularity, an amount of the downward adjustment of the threshold for determining the deployment of the pedestrian protection type deployment system is larger.

After the threshold for determining the deployment of the pedestrian protection type deployment system is adjusted downward, in operation S500, the system determines a duration of the downward adjustment of the threshold for determining the deployment of the pedestrian protection type deployment system through confirmation of the elapsed time counted when the pedestrian collision is predicted.

When the counted time after the prediction of the pedestrian collision is greater than a specific time, the downwardly-adjusted threshold is restored to its original state (in operation S510). Additionally, when the counted time after the prediction of the pedestrian collision is less than the specific time, the downwardly-adjusted threshold is maintained for a certain period of time (in operation S520), and the elapsed time including the time maintained in operation S520 is compared to the specific time (in operation S500). After the threshold for determining the deployment of the pedestrian protection type deployment system is restored in in operation S510, the elapsed time is reset (in operation S530). Furthermore, when the vehicle speed is within the predetermined vehicle speed range again, the procedure proceeds to the predicting of the pedestrian collision (in operation S200). The specific time may only be selected according to a target to which the deployment system for pedestrian protection of a vehicle of the present disclosure is applied, and there is no reason to be limited to a particular time.

FIG. 5 is a detailed flowchart illustrating the prediction of the pedestrian collision (S200) in the predetermined vehicle speed range. In an operation of determining whether pedestrian recognition information is input by an active sensor (in operation S210), it is confirmed whether the pedestrian recognition information is input. The pedestrian recognition information includes a longitudinal relative distance and a transverse position from the vehicle, and a speed of the pedestrian.

When the pedestrian recognition information is input in the determining of whether the pedestrian recognition information is input (S210), longitudinal relative speeds, longitudinal relative distances, and TTCs of the vehicle and the pedestrian are calculated. As a result, it is determined whether the pedestrian is present in the collision prediction zone (in operation S220). The collision prediction zone may be calculated as the first collision prediction zone and the second collision prediction zone in FIGS. 2A and 2B. Additionally, when the pedestrian is included in any one zone, the procedure proceeds to a nest operation.

When it is determined that the pedestrian is present in the collision prediction zone in operation S220, it is additionally determined whether the pedestrian is present within the vehicle width (in operation S230). More specifically, when a transverse position of the pedestrian is present within the vehicle width, a pedestrian collision is predicted (in operation S240).

When the pedestrian is not present in any collision prediction zone in operation S220 or when the transverse position of the pedestrian is not present in the vehicle width in operation S230, the pedestrian collision is not predicted (in operation S250).

When the pedestrian collision is not predicted in operation S250, the threshold for determining the deployment of the pedestrian protection type deployment system maintains a usual threshold. When the pedestrian collision is predicted in operation S240, a count of the elapsed time starts (in operation S300).

In accordance with the present disclosure, unlike the related art, there is an effect of having a threshold variable according to pedestrian collision prediction information and a temperature around a vehicle. This approach avoids always having a low deployment determination threshold at a low temperature condition, and allows restoring the threshold after a short impact predicted time. As a result the deployment system is robust against a mis-deployment signal such as an impact applied to a lower portion of the vehicle and can enables pedestrian protection in a temperature limit condition.

In addition, in accordance with the present disclosure, unlike the related art, by using a method using a 1 g acceleration (full braking) curve and a collision prediction speed, the costs and time required for finding a collision speed through a trial-error of the related art can be reduced. In accordance with the present disclosure, it is possible to solve a problem of the related art in which the costs and time are excessively consumed due to repeated tests resulting from a recognition error of an advanced driver assistance system (ADAS) according to a condition of a road surface.

While the present disclosure has been described with reference to the accompanying drawings, it should be apparent to those having ordinary skill in the art that various changes and modifications can be made without departing from the spirit and scope of the present disclosure without being limited to the embodiments disclosed herein. Accordingly, it should be noted that such alternations or modifications fall within the claims of the present disclosure, and the scope of the present disclosure should be construed based on the appended claims.

What is claimed is:

1. A deployment system for pedestrian protection in a vehicle using pedestrian collision prediction information, the deployment system comprising:

a pedestrian collision prediction part configured to analyze pedestrian collision recognition information and predict a pedestrian collision with the vehicle; and a temperature response variable controller configured to set a deployment determination threshold of the deployment system based on an air temperature when the pedestrian collision is predicted by the pedestrian collision prediction part, wherein the deployment determination threshold is adjusted in response to air temperature changes.

2. The deployment system of claim 1, wherein the temperature response variable controller decreases the deployment determination threshold as the air temperature decreases.

3. The deployment system of claim 2, wherein, when the air temperature is less than or equal to a critical temperature (T_singularity), the deployment determination threshold is adjusted downward as much as $\Delta\alpha$ to be placed below a shock absorber deformation signal of the critical temperature (T_singularity) and a shock absorber deformation signal, by which the deployment system is not deployed at a room temperature, due to an impact applied to a lower portion of the vehicle.

4. The deployment system of claim 3, wherein, when the air temperature is greater than the critical temperature (T_singularity), the deployment determination threshold is adjusted downward as much as $\Delta\beta$ to be placed above the shock absorber deformation signal, by which the deployment system is not deployed at room temperature, due to the impact applied to the lower portion of the vehicle.

5. The deployment system of claim 4, wherein the deployment determination threshold is set above, as much as a safety margin, the shock absorber deformation signal, by which the deployment system is not deployed at room temperature, due to the impact applied to the lower portion of the vehicle.

6. The deployment system of claim 4, wherein $\Delta\alpha$ of the downwardly-adjusted deployment determination threshold is greater than $\Delta\beta$.

7. The deployment system of claim 1, wherein the pedestrian collision prediction part is configured to recognize a collision of a pedestrian with the vehicle through a camera, a radar, or an ultrasonic sensor as the pedestrian collision recognition information.

8. The deployment system of claim 7, wherein the pedestrian collision prediction part is configured to predict the collision of the pedestrian by determining whether the pedestrian is present in a collision prediction zone based on a longitudinal relative speed, a longitudinal relative distance, a time to collision (TTC), and a transverse relative distance with respect to the pedestrian.

9. The deployment system of claim 8, wherein, when an elapsed time is within a specific time after the collision of the pedestrian is predicted, the downwardly-adjusted deployment determination threshold of the deployment system is maintained.

10. The deployment system of claim 8, wherein, when an elapsed time is greater than a specific time after the collision of the pedestrian is predicted, the deployment determination threshold of the deployment system is restored to its original threshold.

11. The deployment system of claim 3, wherein the shock absorber deformation signal is a bumper deformation signal.

12. A method of controlling a deployment system for pedestrian protection in a vehicle using pedestrian collision prediction information, the method comprising:

predicting, by a pedestrian collision prediction part, a collision of a pedestrian;

determining whether an air temperature is greater than a critical temperature (T_singularity); and when the air temperature is greater than the critical temperature (T_singularity), adjusting a deployment determination threshold downward as much as $\Delta\beta$ to be set above a bumper deformation signal, by which the deployment system is not deployed at room temperature, due to an impact applied to a lower portion of the vehicle.

13. The method of claim 12, wherein, when the air temperature is less than or equal to a critical temperature (T_singularity), the deployment determination threshold is adjusted downward as much as $\Delta\alpha$ to be placed below the bumper deformation signal of the critical temperature (T_singularity) and the bumper deformation signal, by which the deployment system for pedestrian protection is not deployed at room temperature, due to the impact applied to the lower portion of the vehicle.

14. The method of claim 12, further comprising:

counting an elapsed time, wherein, when the elapsed time is greater than a specific time, the deployment determination threshold adjusted downward as much as $\Delta\alpha$ or $\Delta\beta$ is restored to its original usual threshold.

15. The method of claim 12, wherein, when the elapsed time is less than or equal to a specific time, the deployment determination threshold adjusted downward as much as $\Delta\alpha$ or $\Delta\beta$ is maintained.

16. The method of claim 12, wherein predicting the collision of the pedestrian includes:

determining whether recognition information of the pedestrian is input;

determining whether the pedestrian is present in a collision prediction zone; and determining whether the pedestrian is present within a vehicle width of the vehicle.

17. The method of claim 16, wherein the recognition information of the pedestrian includes one or more among a longitudinal relative speed, a longitudinal relative distance, a time to collision (TTC), and a transverse relative distance with respect to the pedestrian.

* * * * *